United States Patent
Rune et al.

(10) Patent No.: US 10,897,302 B2
(45) Date of Patent: *Jan. 19, 2021

(54) BEAM SWEEP OR SCAN IN A WIRELESS COMMUNICATION SYSTEM

(71) Applicant: Telefonaktiebolaget LM Ericsson (publ), Stockholm (SE)

(72) Inventors: Johan Rune, Lidingö (SE); Icaro L. J. Da Silva, Solna (SE); Andres Reial, Malmö (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/568,461

(22) Filed: Sep. 12, 2019

(65) Prior Publication Data

US 2020/0028565 A1    Jan. 23, 2020

Related U.S. Application Data

(63) Continuation of application No. 15/635,490, filed on Jun. 28, 2017, now Pat. No. 10,447,374.

(51) Int. Cl.
*H04B 7/06* (2006.01)
*H04B 7/08* (2006.01)
(Continued)

(52) U.S. Cl.
CPC .......... *H04B 7/088* (2013.01); *H04B 7/0695* (2013.01); *H04B 7/0834* (2013.01);
(Continued)

(58) Field of Classification Search
CPC .... H04B 7/088; H04B 7/0834; H04B 7/0695; H04W 4/026; H04W 36/0094; H04W 36/16
See application file for complete search history.

(56) References Cited

U.S. PATENT DOCUMENTS 6,606,058 B1    8/2003  Bonek et al.
7,197,337 B2    3/2007  Goldberg et al.
(Continued)

FOREIGN PATENT DOCUMENTS

CN      1346525 A      4/2002
CN    102812770 A     12/2012
(Continued)

OTHER PUBLICATIONS

Doff, A.,"Sensor Assisted Movement Identification and Prediction for Beamformed 60GHz Links", Delft University of Technology Master's Thesis in Embedded Systems, Jan. 19, 2015, pp. 1-60, Embedded Software Group.

*Primary Examiner* — Syed Haider
(74) *Attorney, Agent, or Firm* — Coats & Bennett PLLC (57) ABSTRACT

A user equipment is configured for use in a wireless communication system. The user equipment in this regard is configured to detect an orientation of an equipment coordinate frame defined for the user equipment relative to an earth coordinate frame defined for Earth. The user equipment is also configured to determine, based on the detected orientation, a set of beams defined in the equipment coordinate frame which does not include any beam pointing in one or more predefined directions in the earth coordinate frame. The user equipment is further configured to perform a beam sweep or scan on the determined set of beams.

21 Claims, 7 Drawing Sheets

(51) Int. Cl.
*H04W 36/00* (2009.01)
*H04W 4/02* (2018.01)
*H04W 36/16* (2009.01)

(52) U.S. Cl.
CPC ....... *H04W 4/026* (2013.01); *H04W 36/0094* (2013.01); *H04W 36/16* (2013.01)

(56) References Cited

U.S. PATENT DOCUMENTS

| | | |
|---|---|---|
| 7,340,279 B2 | 3/2008 | Chen et al. |
| 7,881,258 B2 | 2/2011 | Gilbert et al. |
| 8,351,521 B2 | 1/2013 | Lakkis |
| 8,615,050 B2 | 12/2013 | Lakkis |
| 8,804,796 B2 | 8/2014 | Zhou |
| 9,084,221 B2 | 7/2015 | Sampath et al. |
| 9,100,068 B2 | 8/2015 | Lakkis |
| 9,130,631 B2 | 9/2015 | Sampath et al. |
| 9,318,794 B2 | 4/2016 | Chang et al. |
| 9,647,737 B2 | 5/2017 | Obara et al. |
| 9,680,552 B2 | 6/2017 | Ko et al. |
| 9,876,542 B2 | 1/2018 | Sampath et al. |
| 2002/0137538 A1 | 9/2002 | Chen et al. |
| 2005/0026562 A1 | 2/2005 | Goldberg et al. |
| 2007/0142050 A1 | 6/2007 | Handforth et al. |
| 2009/0232240 A1 | 9/2009 | Lakkis |
| 2009/0298502 A1 | 12/2009 | Hagerman et al. |
| 2009/0318088 A1 | 12/2009 | Wu et al. |
| 2010/0215027 A1 | 8/2010 | Liu et al. |
| 2010/0291931 A1 | 11/2010 | Suemitsu et al. |
| 2011/0018767 A1 | 1/2011 | Maltsev et al. |
| 2011/0032149 A1 | 2/2011 | Leabman |
| 2011/0205969 A1 | 8/2011 | Ahmad et al. |
| 2011/0273977 A1 | 11/2011 | Shapira et al. |
| 2011/0287796 A1 | 11/2011 | Jain et al. |
| 2012/0057575 A1 | 3/2012 | Taghavi Nasrabadi et al. |
| 2012/0263126 A1 | 10/2012 | Choi et al. |
| 2013/0040682 A1* | 2/2013 | Chang ................... H01Q 1/243 342/368 |
| 2013/0198348 A1 | 8/2013 | Zuk et al. |
| 2014/0055302 A1 | 2/2014 | Jia |
| 2014/0073329 A1 | 3/2014 | Kang et al. |
| 2014/0204902 A1 | 7/2014 | Maltsev et al. |
| 2015/0009951 A1 | 1/2015 | Josiam et al. |
| 2015/0071367 A1 | 3/2015 | Hwang et al. |
| 2015/0264583 A1 | 9/2015 | Sundström et al. |
| 2015/0349863 A1* | 12/2015 | El Ayach ............. H04B 7/0456 375/295 |
| 2016/0014566 A1* | 1/2016 | Bengtsson ........... H04W 72/02 455/456.1 |
| 2016/0135007 A1 | 5/2016 | Persson et al. |
| 2016/0198348 A1 | 7/2016 | Jover |
| 2016/0323898 A1 | 11/2016 | Jo et al. |
| 2016/0380820 A1* | 12/2016 | Horvitz .................... G06N 5/04 370/254 |
| 2017/0033854 A1* | 2/2017 | Yoo ........................ H04L 43/08 |
| 2017/0111852 A1 | 4/2017 | Selén et al. |
| 2017/0373731 A1 | 12/2017 | Guo et al. |
| 2018/0152869 A1 | 5/2018 | Cedergren et al. |
| 2019/0379439 A1* | 12/2019 | Bolin .................... H04B 7/063 |

FOREIGN PATENT DOCUMENTS

| | | |
|---|---|---|
| DE | 102010043122 A1 | 5/2012 |
| EP | 2636163 B1 | 1/2020 |
| JP | 2003198441 A | 7/2003 |
| JP | 2009530900 A | 8/2009 |
| RU | 2012108995 A | 9/2013 |
| WO | 2010025996 A1 | 3/2010 |
| WO | 2009057544 A1 | 3/2011 |
| WO | 2013028012 A2 | 2/2013 |
| WO | 2014124237 A1 | 8/2014 |
| WO | 2015086079 A1 | 6/2015 |
| WO | 2016005009 A1 | 1/2016 |
| WO | 2016086144 A1 | 6/2016 |
| WO | 2016180497 A1 | 11/2016 |

\* cited by examiner

BEAM SWEEP OR SCAN IN A WIRELESS COMMUNICATION SYSTEM

RELATED APPLICATIONS

The present application is a continuation of U.S. patent application Ser. No. 15/635,490, which was filed on Jun. 28, 2017 and is incorporated by reference herein in its entirety.

TECHNICAL FIELD

The present application relates generally to methods and apparatus in a wireless communication system, and particularly methods and apparatus related to a beam sweep or scan in a wireless communication system.

BACKGROUND

A transmitter employs beamforming in order to amplify transmitted signals in selected directions, while weakening them in others. To beamform, the transmitter transmits a signal from multiple transmit antennas, but with individually adjusted phase shifts or time delays. This effectively creates a transmit beam in a desired transmit radiation direction of the signal—e.g., through controlled constructive and destructive interference of the phase-shifted signals from individual antenna elements. A transmitter performs a so-called beam sweep in order to determine which of multiple possible transmit beams to use for transmitting to a receiver. The transmitter in this regard transmits known signals on different candidate transmit beams and selects for data transmission whichever of those transmit beams the receiver indicates as being received the best. A typical beam sweep could consist of a set of adjacent beams transmitted one after the other until the entire intended coverage area, e.g. a cell, has been covered.

Correspondingly, a receiver employs beamforming in order to amplify signals received from selected directions while weakening unwanted signals in other directions. The receiver does so by using phase shifts between antenna elements to steer the maximal antenna sensitivity toward a desired direction. This effectively creates a receive beam in the desired direction. A receiver performs a so-called beam scan in order to determine which of multiple possible receive beams to use for receiving from a transmitter. The receiver in this regard receives on different candidate receive beams and selects whichever of those receive beams yields the best receive performance.

A beam sweep or scan improves transmit or receive performance. However, a beam sweep or scan threatens to increase transmit/receive delay, radio resource consumption, energy consumption, and interference due to transmission or reception on multiple beams. This in turn reduces the performance of handover, initial access, or other procedures for which the beam sweep or scan may be performed.

In this document, various terms are used to denote a low-power state in a wireless device, where this state is designed to preserve energy in the wireless device, while still enabling reasonably fast network access, when this is needed. These terms include "idle", "dormant", "inactive", where "idle" may correspond to the RRC_IDLE state in the cellular communication system referred to as Long Term Evolution (LTE) and/or the $5^{th}$ generation system currently being standardized by the standardization organization $3^{rd}$ Generation Partnership Project (3GPP), denoted "New Radio" (NR), while "dormant" and "inactive" may correspond to the RRC_INACTIVE state in NR. Correspondingly, the terms "connected" and "active" are used to denote a state of a wireless device, which is designed for active data communication and fast network access. The terms "connected" and "active" may correspond to the RRC_CONNECTED state in LTE and/or NR.

SUMMARY

According to one or more embodiments herein, a user equipment determines the set of beams on which to perform a beam sweep or scan, based on the user equipment's orientation (relative to Earth). The user equipment bases the beam set determination on its orientation so that the beam set does not include any beam pointing in certain predefined direction(s), such as vertically down towards the ground and/or up towards the sky. Beams in the predefined direction(s) may be excluded for instance on the basis that transmit or receive performance is not likely to meet performance criteria in the predefined direction(s), e.g., because it is not likely that any access node or other wireless communication equipment exists in the predefined direction(s).

In some embodiments, the predefined nature of the excluded direction(s) means that the user equipment does not dynamically determine the direction(s), e.g., based on measuring the geographical position at which an access node or other wireless communication equipment exists relative to the user equipment. The predefined direction(s) may even be statically configured at the user equipment. In these and other embodiments, therefore, the predefined direction(s) may be excluded from a beam sweep or scan even upon user equipment startup, during initial access, while in an inactive state, or at any other time which precludes or limits the ability of the user equipment to measure or receive information indicating the direction in which other wireless communication equipment actually exists. In any event, excluding beams from the beam set in this way advantageously reduces the size of the beam set to be scanned and correspondingly decreases the transmit/receive delay, radio resource consumption, energy consumption, and/or interference attributable to the beam sweep or scan.

More particularly, embodiments herein include a method performed by a user equipment configured for use in a wireless communication system. The method comprises detecting an orientation of an equipment coordinate frame defined for the user equipment relative to an earth coordinate frame defined for Earth. The orientation may be detected for instance based on one or more measurements performed by one or more sensors of the user equipment (e.g., a tilt sensor, a compass, a gravity sensor, etc.), and/or based on detecting which type of application the user equipment executes. In any event, the method also comprises determining, based on the detected orientation, a set of beams defined in the equipment coordinate frame which does not include any beam pointing in one or more predefined directions in the earth coordinate frame. The method further comprises performing a beam sweep or scan on the determined set of beams.

In some embodiments, for example, the one or more predefined directions include a vertically down direction and/or a vertically upward direction. In fact, in some embodiments, the one or more predefined directions include directions within a predefined downward cone that is centered around a vertically down direction in the earth coordinate frame and that extends in the vertically down direction from a vertex at the user equipment. The one or more predefined directions may alternatively or additionally include directions include directions within a predefined upward cone that is centered around a vertically upward direction in the earth coordinate frame and that extends in the vertically upward direction from a vertex at the user equipment.

In some embodiments, determining the set of beams comprises selecting the set of beams from multiple sets of beams predefined for different detectable orientations of the equipment coordinate frame relative to the earth coordinate frame. In this case, each of the multiple sets of beams does not include any beam pointing in the one or more predefined directions in the earth coordinate frame. Alternatively, determining the set of beams may comprise identifying that one or more candidate beams point in the one or more predefined directions and forming the set of beams on which to perform the beam sweep or scan by either subtracting the one or more identified candidate beams from the set or adding beams to the set other than the one or more identified candidate beams.

In some embodiments, the method further comprises deciding whether the set of beams is to not include any beam pointing in at least one of the one or more predefined directions, based on evaluating one or more predefined criteria. In one embodiment, for example, at least one criterion of the one or more predefined criteria comprises types of access nodes between which the user equipment is or will hand off. Alternatively or additionally, at least one criterion of the one or more predefined criteria comprises an altitude at which the user equipment is detected, estimated, or assumed to be located. In still other embodiments, at least one criterion of the one or more predefined criteria comprises whether the user equipment is located indoors or outdoors.

In any of the above embodiments, performing the beam sweep or scan may comprise performing the beam sweep or scan during or before a procedure for initial access to the wireless communication system, while the user equipment is in an idle or inactive state or is performing a procedure for transitioning from an idle or inactive state to a connected state, or during or in preparation of a handover procedure.

Note that the method in some embodiments further comprises receiving signaling from a network node indicating a number of beams that are or that are to be included in the determined set of beams.

Embodiments herein further include corresponding apparatus, computer programs, and carriers (e.g., computer-readable medium).

DETAILED DESCRIPTION

Figure 1A:
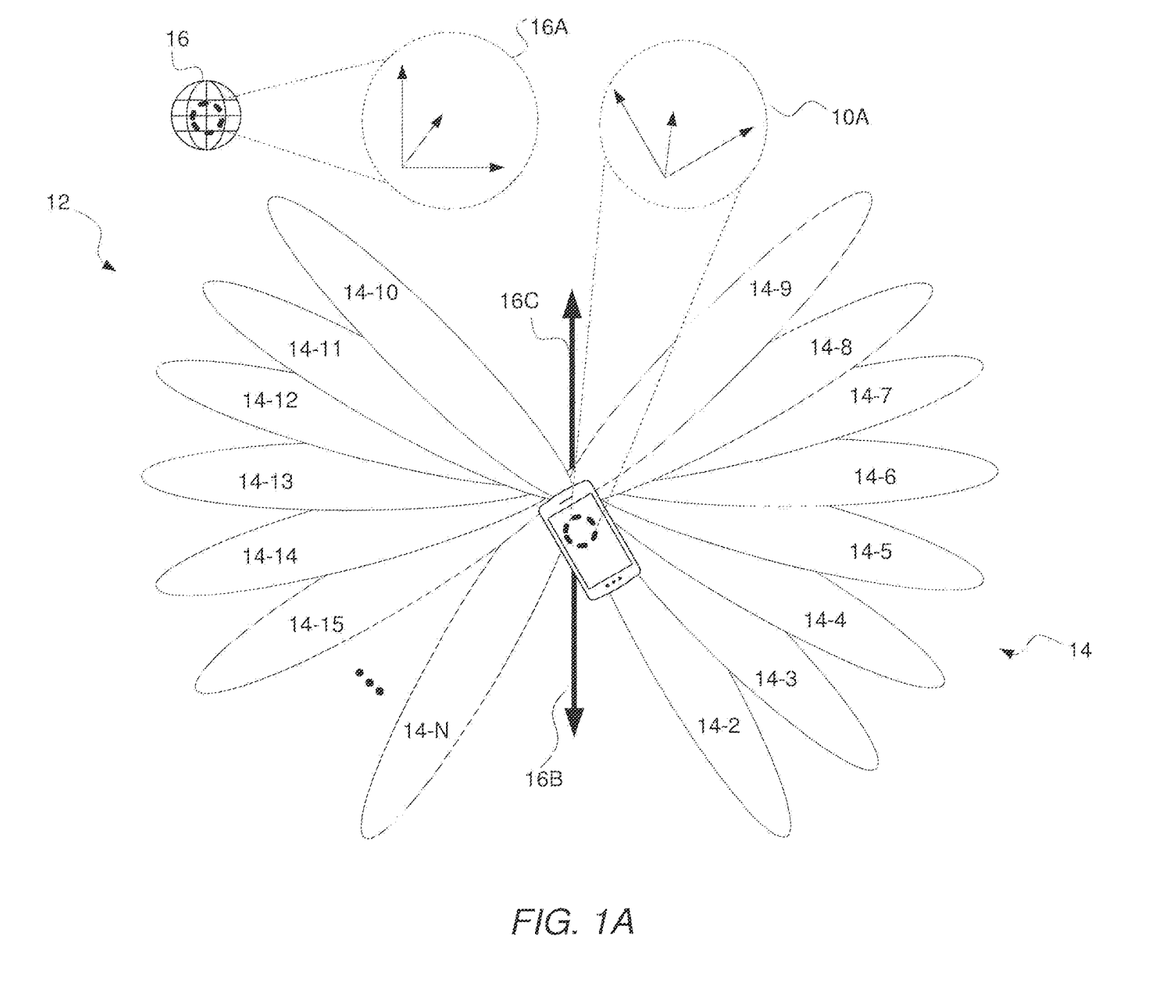
FIG. 1A is a block diagram of a wireless communication system that includes a user equipment according to some embodiments herein.

FIG. 1A shows a user equipment 10 (UE) in a wireless communication system 12 (e.g., a 5G system, such as the 5G system currently being standardized by the standardization organization $3^{rd}$ Generation Partnership Project (3GPP), denoted New Radio (NR)) according to some embodiments. The user equipment 10 is configured to perform a beam sweep or scan. The user equipment 10 in this regard determines a set 14 of beams 14-1, 14-2, . . . , 14-N on which to perform the beam sweep or scan, and then performs the beam sweep or scan on that set 14 of beams. This may involve for instance transmitting or receiving reference signals on each of the beams in the set 14, and comparing the resulting performance (e.g., signal quality) on the beams. As a result of the beam sweep or scan, the user equipment 10 may select one or more of the beams in the set 14 as being the beam(s) on which to transmit or receive other signals, e.g., over a user data channel or a control channel.

The user equipment 10 according to some embodiments herein determines the set 14 of beams on which to perform the beam sweep or scan, based on the user equipment's orientation. The user equipment 10 bases the beam set determination on its orientation so that the set 14 does not include any beam pointing in one or more predefined directions, e.g., a vertically down direction towards the ground. In some embodiments, excluding any such beam from the set 14 in this way advantageously reduces the size of the set 14 and correspondingly decreases the transmit/receive delay, radio resource consumption, energy consumption, and/or interference attributable to the beam sweep or scan.

Figure 1B:
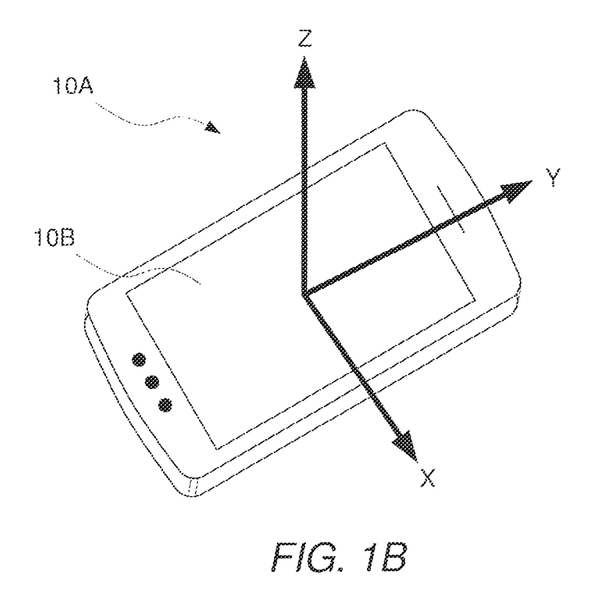
FIG. 1B is a block diagram of an equipment coordinate frame defined for a user equipment according to some embodiments.

More particularly in this regard, FIG. 1A shows that an equipment coordinate frame 10A is defined for the user equipment 10. This equipment coordinate frame 10A defines the local frame of reference of the user equipment 10 in two dimensional or three dimensional space. FIG. 1B, for example, shows that the equipment coordinate frame 10A may be described in three dimensions by coordinate axes x, y, and z, with the origin aligned to the center of the user equipment 10. As shown in this example, the x-axis is defined in the plane of the equipment's screen 10B with positive towards the right of the screen, the y-axis is defined in the plane of the screen 10B with positive towards the top of the screen, and the z-axis is defined perpendicular to the plane of the screen 10B with positive extending away from the screen. In other embodiments, of course, the coordinate axes may be defined with respect to something other than a screen (e.g., a keyboard, an antenna, a center of the user equipment, etc.), especially where the user equipment 10 lacks any such screen.

FIG. 1A also shows that an earth coordinate frame 16A is defined for Earth 16. The earth coordinate frame 16A may be aligned based on the gravity and standard magnetic orientation of the Earth. For example, the earth coordinate frame 16A may be described in three dimensions by coordinate axes x, y, and z, with the x-axis representing the east-west direction, the y-axis representing the north-south direction, and the z-axis representing the vertically up-down direction, perpendicular to Earth's ground.

The user equipment 10 is configured to detect the orientation of its equipment coordinate frame 10A relative to the earth coordinate frame 16A (in one or more dimensions or coordinate axes of the frames 10A, 16A), so as to detect the user equipment's orientation relative to Earth 16. The user equipment 10 may for instance detect such orientation based on one or more measurements performed by one or more sensors of the user equipment 10 (e.g., a tilt sensor, a compass, a gravity sensor, i.e., accelerometer, and/or another type of sensor internal to the user equipment 10). The measurement(s) in some embodiments indicate the rotation (e.g., in degrees) between the equipment and earth coordinate frames 10A, 16A as roll, pitch, and/or yaw values, whereas in other embodiments the measurement(s) additionally or alternatively indicate the proper acceleration of the user equipment 10, with or without the effects of gravity excluded, in one or more dimensions of the equipment coordinate frame 10A.

Alternatively or additionally, the user equipment 10 may detect its orientation based on which type of application the user equipment 10 (currently) executes. For example, the user equipment 10 may associate execution of a voice call application (without hands-free) with the user equipment 10 being in a predefined orientation consistent with placement near a user's head for a call, e.g., in a mostly vertical or "portrait" orientation. In this case, then, the user equipment 10 may detect the predefined orientation when it detects execution of the voice call application, even without explicit sensor measurements. The user equipment 10 may of course associate execution of other types of applications (e.g., photo/video applications, text or email applications, video applications, games) with other predefined orientations (e.g., landscape). Moreover, the user equipment 10 in some embodiments may dynamically adjust the orientations associated with applications, using sensor measurements taken during application execution, so as to effectively learn or predict the actual orientations that exist when those applications execute. As these embodiments demonstrate, therefore, the user equipment 10 may generally detect its orientation relative to Earth as being a certain measured, estimated, or predicted orientation, using one or more types of orientation-detecting approaches.

No matter the particular way the user equipment 10 detects its orientation relative to Earth 16, the user equipment 10 leverages knowledge of its orientation in order to determine the set 14 of beams on which to perform a beam sweep or scan. The user equipment 10 in particular determines a set 14 of beams defined in the equipment coordinate frame 10A which does not include any beam pointing in one or more predefined directions in the earth coordinate frame 16A. The predefined direction(s) may be excluded based on an estimate or assumption that transmit or receive performance is unlikely to meet performance criteria on beams pointing in the predefined direction(s), e.g., because no access node or other wireless communication equipment with which the user equipment 10 desires to communicate is likely to exist in the predefined direction(s). Beams pointing in the predefined direction(s) may therefore be deemed by the user equipment 10 as so unreasonable or unlikely to be selected that they are proactively excluded from the set 14 of beams on which a sweep or scan will be performed; that is, they are excluded from the set 14 even without evaluating their performance.

FIG. 1A, for example, shows that the set 14 of beams does not include any beam pointing in a vertically down direction 16B in the earth coordinate frame 16A. The vertically down direction 16B may be excluded based on the assumption or estimation that no access node or other wireless communication equipment is likely to exist in the vertically down direction 16B (e.g., towards the ground). Because the set 14 is determined based on the equipment's orientation relative to Earth 16, the set 14 of beams in this regard may exclude any beam in the vertically down direction 16B even if the equipment's coordinate frame 10A is disoriented with respect to the earth coordinate frame 16A (e.g., such that the vertically down direction as defined in the equipment coordinate frame 10A is not aligned with the vertically down direction 16B as defined in the earth coordinate frame 16B). Of course, although FIG. 1A just shows excluding any beam pointing in the vertically down direction 16B, the set 14 of beams may alternatively or additionally not include any beam pointing in one or more other directions. For example, in some embodiments, the set 14 does not include any beam pointing in directions within a predefined downward cone that is centered around the vertically down direction 16B and that extends in the vertically down direction 16B from a vertex at the user equipment 10.

Alternatively or additionally, the set 14 of beams may not include any beam pointing in a vertically upward direction 16C in the earth coordinate frame 16A. The vertically upward direction 16C may similarly be excluded based the assumption or estimation that no access node or other wireless communication equipment is likely to exist in the vertically upward direction 16C (e.g., straight up towards the sky). Of course, in some embodiments, the set 14 also or alternatively does not include any beam pointing in directions within a predefined upward cone that is centered around the vertically upward direction 16C and that extends in the vertically upward direction 16C from a vertex at the user equipment 10. In any event, note that exclusion of the vertically upward direction 16C and/or the vertically downward direction 16B may just involve the user equipment 10 detecting its orientation in two dimensions (relative to the earth's horizontal plane), as opposed to three dimensions.

Figure 2A:
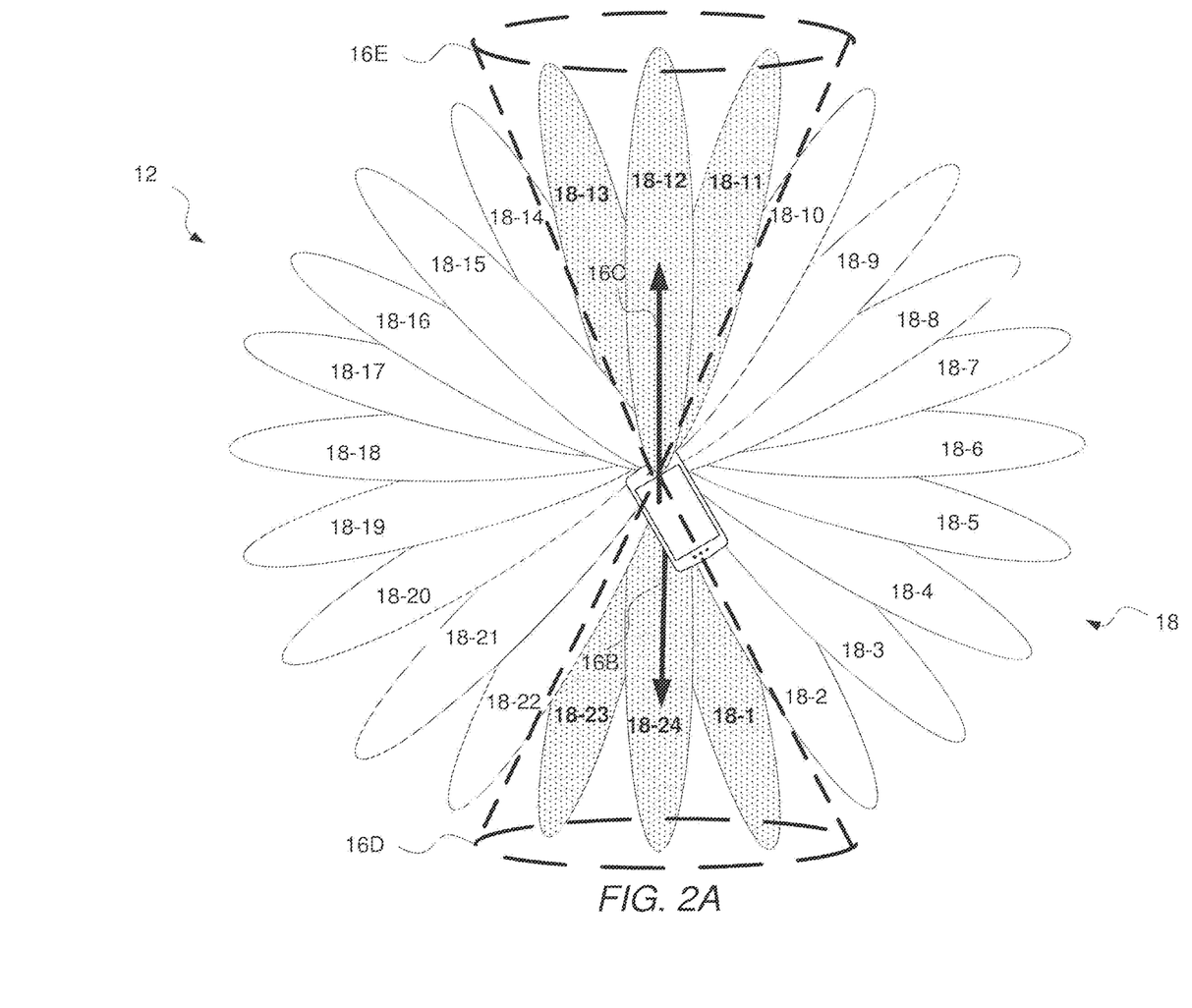
FIG. 2A is a block diagram of a beam set determined according to one or more embodiments herein for performing a beam sweep or scan.

No matter the particular predefined direction(s), beams pointing in the direction(s) may be excluded from the set 14 in any number of ways. In some embodiments, for example, the user equipment 10 adapts or actively forms the set 14 of beams on which to perform the beam sweep or scan. The user equipment 10 may for instance add to the set 14 beams other than those pointing in the predefined direction(s), or subtract from the set 14 any beam pointing in the predefined direction(s). FIG. 2A illustrates one example in this regard.

As shown in FIG. 2A, the user equipment 10 is configured with a comprehensive set 18 of candidate beams. The set 18 of candidate beams is comprehensive in the sense that it nominally includes beams pointing in multiple possible directions in the equipment coordinate frame 10A, irrespective of whether those beams (depending on the user equipment's orientation) may point in the predefined direction(s) in the earth coordinate frame 16A to be excluded from a beam sweep or scan. FIG. 2 in this regard shows twenty-four beams 18-1, 18-2, . . . , 18-24 that respectively point in twenty-four directions in the equipment coordinate frame 10A.

The user equipment 10 is configured to form the set 14 of beams on which to perform a beam sweep or scan from this comprehensive set 18 of candidate beams. In particular, the user equipment 10 identifies, based on the orientation of its equipment coordinate frame 10A relative to the earth coordinate frame 16A, which candidate beams in the comprehensive set 18, if any, point in the one or more predefined directions in the earth coordinate frame 16A (e.g., by translating between the coordinate frames 10A, 16A). In FIG. 2A's example, the user equipment 10 identifies that candidate beams 18-23, 18-24, and 18-1 point in directions within a predefined downward cone 16D centered around the vertically downward direction 16B, and that candidate beams 18-11, 18-12, and 18-13 point in directions within a predefined upward cone 16E centered around the vertically upward direction 16C. The user equipment 10 accordingly forms the set 14 of beams on which to perform a beam sweep or scan such that the set 14 does not include the identified candidate beam(s). In the example, this means the user equipment 10 forms the set 14 of beams so that the set 14 does not include any of beams 18-1, 18-11, 18-12, 18-13, 18-23, or 18-24. All other candidate beams may be included, absent additional information justifying their exclusion. The user equipment 10 may form the set 14 by for instance adding to the set 14 candidate beams other than those beams to be excluded, or by subtracting from the set 14 those beams to be excluded.

Figure 2B:
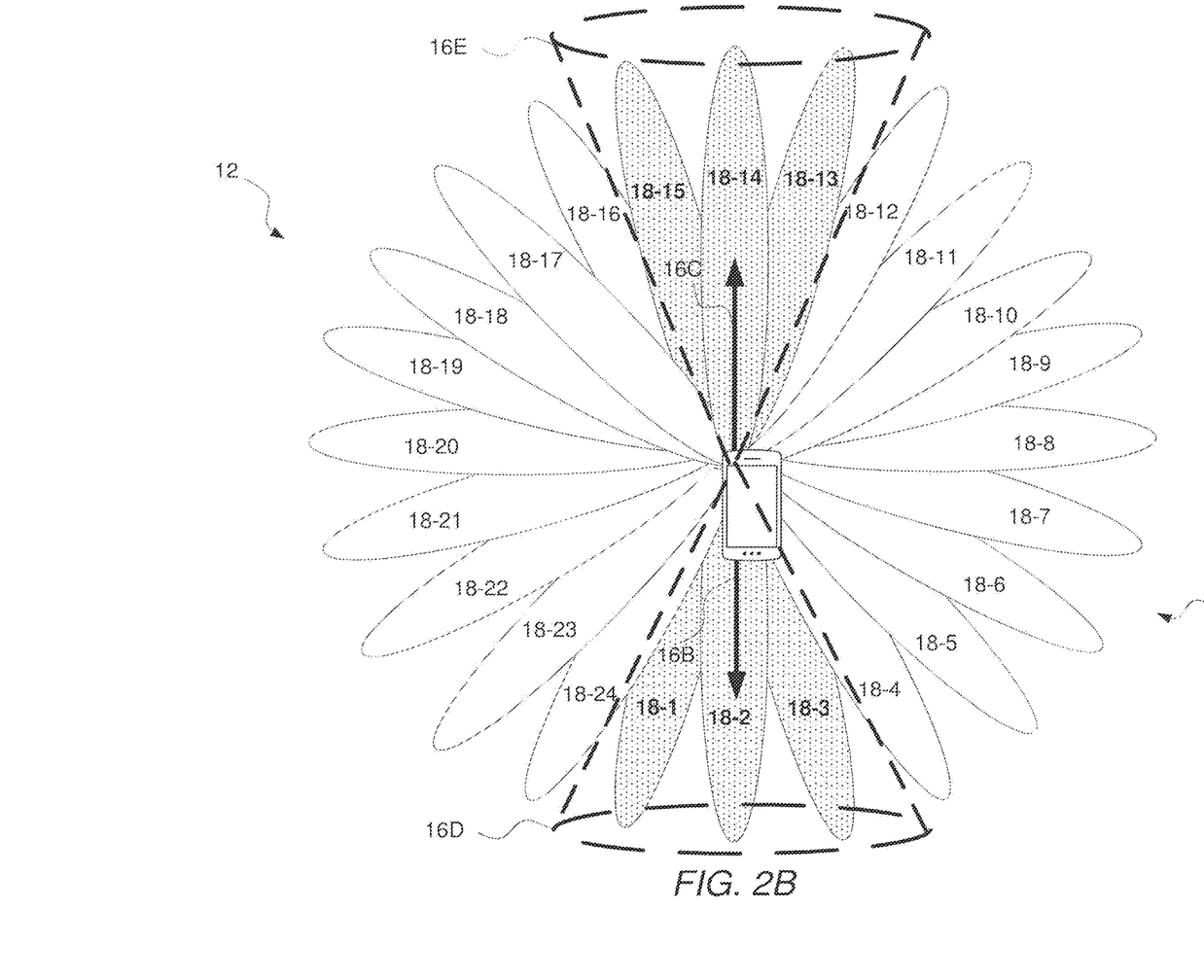
FIG. 2B is a block diagram of a beam set determined according to one or more other embodiments herein for performing a beam sweep or scan.
Figure 3A:
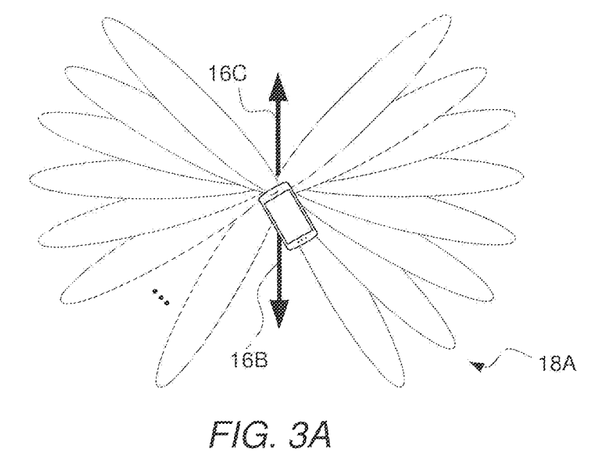
FIGS. 3A-3D are block diagrams of different candidate beam sets determined according to one or more embodiments herein for performing a beam sweep or scan.
Figure 3B:
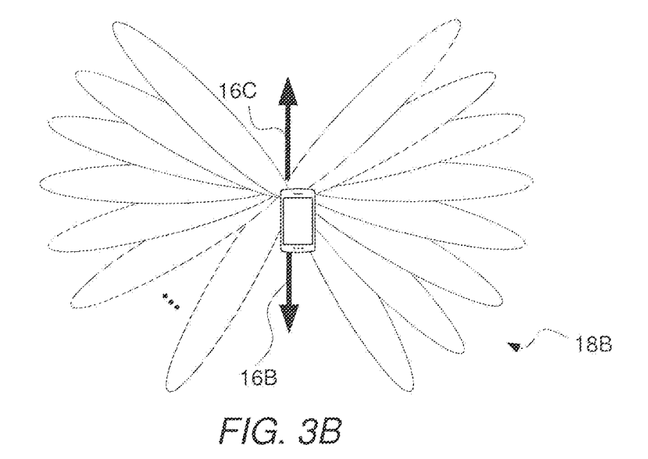
Figure 3C:
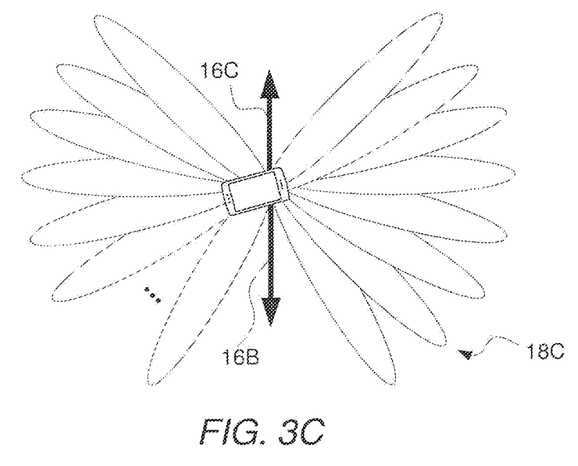
Figure 3D:
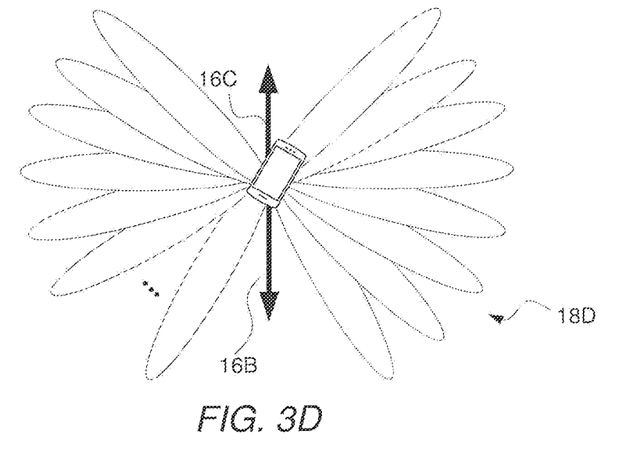

The user equipment 10 may adjust the set 14 or otherwise form the set 14 to include/exclude other beams to account for any change in the detected orientation of the equipment coordinate frame 10A relative to the earth coordinate frame 16A. FIG. 2B shows for example that the user equipment 10 is rotated in orientation as compared to FIG. 2A. Based on this detected orientation, the user equipment 10 may adjust or otherwise form the set 14 so that it instead excludes candidate beams 18-1, 18-2, 18-3, 18-13, 18-14, and 18-15, since with this orientation those are the candidate beams pointing in directions within the predefined upward and downward cones 16D, 16E.

In other embodiments, the user equipment 10 selects the set 14 of beams on which to perform the beam sweep or scan from multiple candidate sets of beams predefined for different detectable orientations of the equipment coordinate frame 10A relative to the earth coordinate frame 16A. In this case, each of the multiple candidate sets of beams does not include any beam pointing in the one or more predefined directions in the earth coordinate frame 16A. In this case, therefore, rather than selecting the beams to include in or exclude from the set 14, the user equipment 10 instead may select the set 14 from multiple sets that are already preconfigured to exclude the beam(s) pointing in the predefined direction(s) in the earth coordinate frame 16A.

FIGS. 3A-3D illustrate as an example multiple candidate sets 18A-18D of beams predefined for different detectable orientations. Each candidate set 18A-18D does not include any beam pointing in predefined direction(s) in the earth coordinate frame 16A (e.g., vertically down and up directions 16B, 16C), e.g., since each candidate set is preconfigured for a certain user equipment orientation. When the user equipment 10 detects its orientation as being that shown in FIG. 3A, the user equipment 10 selects candidate set 18A as the set 14 on which to perform a beam sweep or scan. Conversely, when the user equipment 10 detects its orientation as being that shown in FIG. 3B, the user equipment 10 selects candidate set 18B as the set 14 on which to perform a beam sweep or scan. The same can be said for sets 18C and 18D. In these and other embodiments, therefore, the user equipment 10 may simply select the set 14 on which to perform a beam sweep or scan as a function of its detected orientation, e.g., according to a mapping that maps different orientations to respective sets of beams.

As a further example, some attractive directions to have preconfigured candidate sets of beams for is a full circle (360 degrees) of suitably spaced beam directions (i.e. a suitable granularity) with a certain angle, e.g. 30 degrees upwards, in relation to the horizontal plane (e.g. in terms of a polar angle in a spherical coordinate system fixed to the horizontal plane). As the user equipment 10 may be tilted in any way in relation to the horizontal plane, the user equipment 10 should be prepared for having the horizontal plane in an arbitrary angle in relation to the user equipment 10 (in practice, a set of horizontal plane angles/inclinations would have to be chosen with a suitable granularity) and preconfigure candidate beam sets for beam directions with the desired angle in relation to any of these possible horizontal plane angles in relation to the user equipment 10. That is, for each chosen relative horizontal plane angle the user equipment 10 should be prepared with a candidate set of beams, together covering the full circle (360 degrees) with suitably spaced beam directions with the desired angle, e.g. 30 degrees upwards, in relation to the horizontal plane.

Note that the above is merely an example and the total number of pre-configured beam sets/beam directions may not only cover a certain angle in relation to the horizontal plane, but also other directions, e.g. other angles in relation to the horizontal plane. Also note that, although the horizontal may be a suitable reference for beam directions (and corresponding beam sets), other references could also be used, e.g. the vertical direction.

In this regard, if the user equipment 10 has a uniform array, then the vertical dimension (e.g. the polar angle in a spherical coordinate system fixed to the horizontal plane) of the estimated direction of arrival in one azimuth can be used in other azimuths as well (i.e. "extrapolation" of the polar angle). That is, if the user equipment 10 has a uniform antenna array, the antenna configuration for just one beam may be preconfigured for each possible user equipment orientation, and then the antenna configurations for the rest of the beams in the set for that user equipment orientation may be inferred or extrapolated from the single preconfigured antenna configuration. But there is the challenge that the directivity of a non-uniform array at the user equipment 10 is harder to "extrapolate" to directions other than the particular azimuth just measured. Therefore, each predefined beam set may span the whole azimuth span (360 degrees). That is, the antenna configurations of all the beams in the set may have to be preconfigured for such a user equipment.

No matter the particular way that the user equipment 10 excludes beams pointing in predefined direction(s), such exclusion in some embodiments is unconditional. That is, the set 14 of beams on which the equipment 10 performs a beam sweep or scan unconditionally excludes any beam pointing in one or more of the predefined direction(s) (e.g., in the vertically downward direction 16B). This may be the case for instance if it is always assumed that no access node or other wireless communication equipment is likely to exist in a predefined direction.

In other embodiments, exclusion of any beam pointing in one or more of the predefined direction(s) is conditional. That is, the set 14 of beams on which the equipment 10 performs a beam sweep or scan conditionally excludes any beam pointing in one or more of the predefined direction(s), depending on whether one or more conditions are met. In this case, therefore, the user equipment 10 may be configured to decide whether the set of beams is to not include any beam pointing in one or more of the predefined directions, based on evaluating one or more predefined criteria. The criteria may concern for instance the types of access nodes between which the user equipment is handing off or will hand off, an altitude at which the user equipment is detected, estimated, or assumed to be located, and/or characterization of the environment in which the user equipment is located (e.g., indoors vs. outdoors).

For instance, the set 14 of beams may conditionally exclude any beam pointing in the vertically upward direction

16C, if one or more conditions are met. For instance, the vertically upward direction 16B may be excluded if the user equipment 10 is handing off or will hand off between macro (i.e., high-power) access nodes or cells (i.e., cells with the widest coverage area, as opposed to micro or pico cells). Indeed, in such a handover scenario, the user equipment 10 is unlikely to be located straight below the macro access nodes' antennas, meaning that a beam pointing in the vertically upward direction 16C is unlikely to have performance sufficient for selection. On the other hand, the vertically upward direction 16B may not be excluded if the user equipment 10 is handing off or will hand off from a macro cell to a pico cell, or from a pico cell to another pico cell (e.g., in an indoor scenario), since it is possible in these cases that the user equipment 10 is located straight below the pico access node's antenna(s).

Similarly, the set 14 of beams may conditionally exclude any beam pointing in the vertically downward direction 16B, if one or more conditions are met. For instance, the vertically downward direction 16B may be excluded unless the user equipment 10 is measured, estimated, or assumed to be located at a relatively high altitude or in a certain environment (e.g., indoors) such that an access node may be located below the user equipment 10.

As these examples demonstrate, the excluded direction(s) may be predefined even in embodiments described above where the user equipment 10 conditions exclusion of any beam pointing in a direction on one or more conditions being met. The user equipment 10 in a broad sense therefore may be configured to determine a set 14 of beams on which to perform a beam sweep or scan that unconditionally or conditionally does not include any beam pointing in one or more predefined directions. In the conditional case, an excluded direction is predefined (e.g., as vertically upward or downward), whereas the decision as to whether any beam pointing in that predefined direction is to be excluded may be dynamically determined based on whether condition(s) are met. That is, it is not the direction that the user equipment 10 dynamically determines, but rather whether to exclude any beam pointing in that direction.

Accordingly, in one or more embodiments, the predefined nature of the excluded direction(s) means that the user equipment 10 does not dynamically determine the direction(s). The user equipment 10 for instance does not dynamically determine the predefined direction(s) to conditionally or unconditionally exclude based on measuring the geographical position or angle at which an access node or other wireless communication equipment does or does not exist relative to the user equipment 10, based on receiving signaling indicating such geographical position or angle, and/or based on any other information that indicates the presence or absence of an access node or other wireless communication equipment in a certain direction. Without the user equipment 10 dynamically determining the predefined direction(s), the predefined direction(s) may even be statically configured at the user equipment 10. The predefined nature of the excluded direction(s) in this sense contributes to processing simplicity and power efficiency at the user equipment 10.

In these and other embodiments, therefore, the predefined direction(s) may be excluded from a beam sweep or scan even upon user equipment (cold) startup, during or before initial network access, while in an inactive state, or at any other time which precludes or limits the ability of the user equipment 10 to perform positioning measurements or receive information indicating the direction in which other wireless communication equipment (e.g., an access node) actually exists.

More particularly, the user equipment 10 in some embodiments performs the beam sweep or scan on the determined set 14 of beams during or before a procedure for initial access to the system 12, during a procedure for state transition (e.g., idle/dormant to connected/active state), and/or while the user equipment is in an idle or inactive state. The user equipment 10 may for instance perform a beam sweep by transmitting uplink signals (e.g., random access preamble signals) on the determined set 14 of beams, and/or perform a beam scan by receiving downlink signals (e.g., pilot signals and/or system information) on the determined set 14 of beams. The user equipment 10 may transmit and/or receive these signals one signal at a time in case of analog beamforming or may transmit and/or receive at least some of the signals simultaneously in parallel in case of digital beamforming.

Note that some access nodes may be deployed in the system 12 as booster nodes for high data rates. Such access nodes may not transmit any pilot signals, unless requested, e.g., when requested by another access node in conjunction with handover. Hence, these access nodes may not be available for initial access or state transition, but instead only available via handover from another access node. But even though not transmitting any pilot signals, the access nodes may still listen for random access transmissions (e.g., random access preamble signals) and may respond to them for access.

Alternatively or additionally, the user equipment 10 in some embodiments performs the beam sweep or scan on the determined set 14 of beams during or in preparation of a handover procedure. Consider for instance a downlink measurement based handover that uses beamforming. In this case, whenever handover is performed (e.g., from one access node or frequency to another), the user equipment 10 may perform a beam scan on the determined set 14 of beams (which are receive beams in this case), in an attempt to detect a synchronization and/or beam identification signal (e.g., a synchronization signal, a synchronization and reference signal, a pilot signal, a Mobility and access Reference Signal, MRS, or a Channel State Information Reference Signal, CSI-RS, or any other type of reference signal), where the beam identification signal identifies the transmit beam over which that signal is transmitted. The user equipment 10 may then report back information indicating which transmit beam(s) the user equipment 10 detected with at least a certain performance, to support selection of the target access node (and transmit beam) for the handover. The user equipment 10 may for instance report the result of its measurements to the source access node, e.g., using a radio resource control (RRC) message. Or, the user equipment 10 may send an uplink signal directly to the candidate access node that transmitted the downlink beam signal that the user equipment 10 perceived as the best (e.g., best signal quality). The uplink signal may be for instance an Uplink Synchronization Signal (USS) or a random access preamble. Reporting directly to the best candidate access node is a fast and resource efficient way of reporting, and is more robust in the case of fast deterioration of the serving link to the source access node.

Alternatively or additionally, the user equipment 10 may perform a beam sweep on the determined set 14 of beams (which are transmit beams in this case), in order to transmit an uplink signal that explicitly or implicitly reports the result of its measurements. The user equipment 10 may for instance repeat the uplink signal on each beam in the set 14, one at a time.

Consider also an uplink measurement based handover that uses beamforming. In this case, the user equipment 10 performs a beam sweep on the determined set 14 of beams (which are transmit beams in this case). The user equipment 10 in this regard transmits uplink signals (e.g., sounding signals, reference signals, or a combination thereof) on the beams in the set 14. Candidate cells or access nodes measure these uplink signals in terms of quality. One of those candidate cells or access nodes is then selected as a target for handover, e.g., as a function of measured uplink quality and/or an estimate of downlink quality based on uplink/downlink reciprocity. The user equipment 10 may receive information indicating the handover target selected by the network and then perform handover to the indicated target.

The above examples generally illustrate therefore that there are various cases where the user equipment 10 may need to perform a beam sweep or scan. Such a beam sweep or scan has heretofore significantly increased both delay and resource consumption as well as increased the interference in the system. The increased delay is not only a performance issue in itself, but in handover cases the increased delay also increases the risk of handover failure and loss of the radio link (radio link failure). The consumed resources are both radio resources and energy (reducing the battery lifetime in the user equipment). This can affect uplink transmit resources, downlink transmit resources (for repetition of downlink beams to support user equipment beam scanning) and uplink receive resources in access nodes.

One or more embodiments herein generally leverage spatial information (e.g., rotation or orientation) from the user equipment's internal sensors to eliminate unreasonable or unlikely beam directions which are irrelevant (or the most likely to be irrelevant) for a user equipment's beam sweep or scan. The reference case or default solution without such elimination would be a full beam sweep or scan at the user equipment in all possible directions. One or more embodiments herein thereby reduce the number of beam directions a user equipment includes in a beam sweep or scan procedure, e.g., in conjunction with handover or initial access or state transition. This serves to reduce the delay of the concerned procedure, which is good for the performance of the service delivered by the network. In the handover case, the reduced delay also reduces the risk for handover failure and loss of the radio link (radio link failure). In addition, the downsizing of the beam sweep or scan also reduces the interference in the system as well as the resource consumption, including transmit/receive radio resources and energy (thereby extending the battery lifetime in the user equipment). According to some embodiments, the user equipment may also provide radio resource measurements faster to the network compared to the case where a full beam scan needs to be done e.g. in the case the downlink measurement based handover for measuring downlink MRSs/beams. That may prevent the user equipment from spending too much time performing radio resource measurements and potentially losing the link before reporting the MRS/beam quality to the network.

Note that, in some embodiments where the beam sweep or scan is performed during or in preparation for handover, the source access node instructs the user equipment 10 (when configuring the user equipment for the downlink beam sweep measurement procedure) of how many receive beams to try for each candidate downlink beam and/or the number of transmit beams to use for the uplink signal transmission. The source access node in some embodiments bases the number of receive/transmit beams on information such as the urgency of the handover procedure (e.g. how fast the serving link can be assumed to deteriorate and consequently how long delay is acceptable for the handover), etc. Yet another alternative is that the network instructs the user equipment 10 of how many receive and/or transmit beams to use in the system information. This is especially beneficial in the case where multiple user equipments would benefit from the same downlink signal (e.g. MRS) beam sweep, e.g. in the case of common periodic MRSs. In that case, the network may decide to configure the downlink MRS beam sweep, e.g. for the user equipments requiring the greatest number of DL beam repetitions (for receive beam trials).

Also note that, in some embodiments, the user equipment 10 is configured to perform a beam sweep or scan on the determined (reduced) set 14 of beams as a first stage or pass, with predefined direction(s) excluded. If the beam sweep or scan proves insufficient with use of the reduced set 14 of beams, e.g., the user equipment 10 may complement the initial beam sweep or scan with a second pass sweep or scan on beams pointing in the predefined direction(s) that were initially excluded in the first pass.

The system 12 in some embodiments is a 5G system, or any system that uses very high frequency ranges for communication (e.g., at or above 10 GHz) and/or uses very high-gain narrow beamforming. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency, i.e., the link budget would be worse for the same link distance even in a free space scenario, if omnidirectional receive and transmit antennas are used. This motivates the usage of beamforming to compensate for the loss of link budget in high frequency spectrum. Beamforming may be used at the transmitter, at the receiver, or both. In a large part of the spectrum planned for 5G deployments, the preferred configuration is to use a large antenna array at the Access Node (AN) and a small number of antennas at the user equipment. The large antenna array at the AN enables high-order transmit beamforming in the downlink.

For the above reasons, the system 10 may make heavy use of high-gain, narrow beamforming, which will enable high data rate transmission coverage also to very distant user equipment which would not realistically be covered with normal sector-wide beams, which have lower antenna gain. In these and other cases, even performing synchronization or exchanging some initial control signaling messages at the handover target may require selection of a sufficiently good beam direction in order for the access node and the user equipment 10 to hear each other sufficiently well. Nonetheless, a beam as used herein may be any size beam created through beamforming, i.e., a beam may be a narrow beam as described above or even a sector-wide beam.

Note too that although beams were by necessity illustrated in the figures in one dimensional space, beams herein may have coverage areas that are described in one, two, or three dimensional space. Moreover, although a signal has been referred to as being transmitted "on" a beam, a signal may in other senses be said to be transmitted "in" or "over" or "using" a beam. Yet another alternative expression is that the signal transmission is "beamformed".

Embodiments herein are generally applicable however to any type of wireless communication system 12 which employs beamforming. Indeed, embodiments may use any of one or more communication protocols known in the art or that may be developed, such as IEEE 802.xx, CDMA, WCDMA, GSM, LTE, UTRAN, WiMax, or the like, also including 5$^{th}$ generation (5G) systems, such as the 5G system currently being standardized by 3GPP, denoted New Radio (NR). Accordingly, although sometimes described herein in the context of 5G, the principles and concepts discussed herein are applicable to 4G systems and others.

A user equipment is any type of device capable of communicating with a radio network node or another user equipment wirelessly over radio signals. A user equipment may therefore refer to a mobile station, a laptop, a smartphone, a machine-to-machine (M2M) device, a machine-type communications (MTC) device, a narrowband Internet of Things (IoT) device, etc. That said, it should be noted that a user equipment does not necessarily have a "user" in the sense of an individual person owning and/or operating the device. A user equipment may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine or machine-to-human/human-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IoT scenario, a user equipment as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment as described herein may be comprised in a vehicle and may perform monitoring and/or reporting of the vehicle's operational status or other functions associated with the vehicle.

As used herein, a "radio network node" or access node refers to network equipment capable, configured, arranged and/or operable to communicate directly or indirectly with a user equipment and/or with other equipment in the wireless communication system that enable and/or provide wireless access to the user equipment. Examples of network equipment include, but are not limited to, base stations (BSs), radio base stations, Node Bs, multi-standard radio (MSR) radio nodes such as MSR BSs, evolved Node Bs (eNBs), gNodeBs (gNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, a radio network node may represent any suitable device (or group of devices) capable, configured, arranged, and/or operable to enable and/or provide a user equipment access to the wireless communication network or to provide some service to a user equipment that has accessed the wireless communication network. The list above is not intended to express just alternative radio network nodes, but to express various examples of classes of network equipment as well as examples of specific network equipment.

Some embodiments herein are described with reference to a wireless link. A wireless link may take the form of a cell, a sector, a beam, an access node, or the like.

Figure 4:
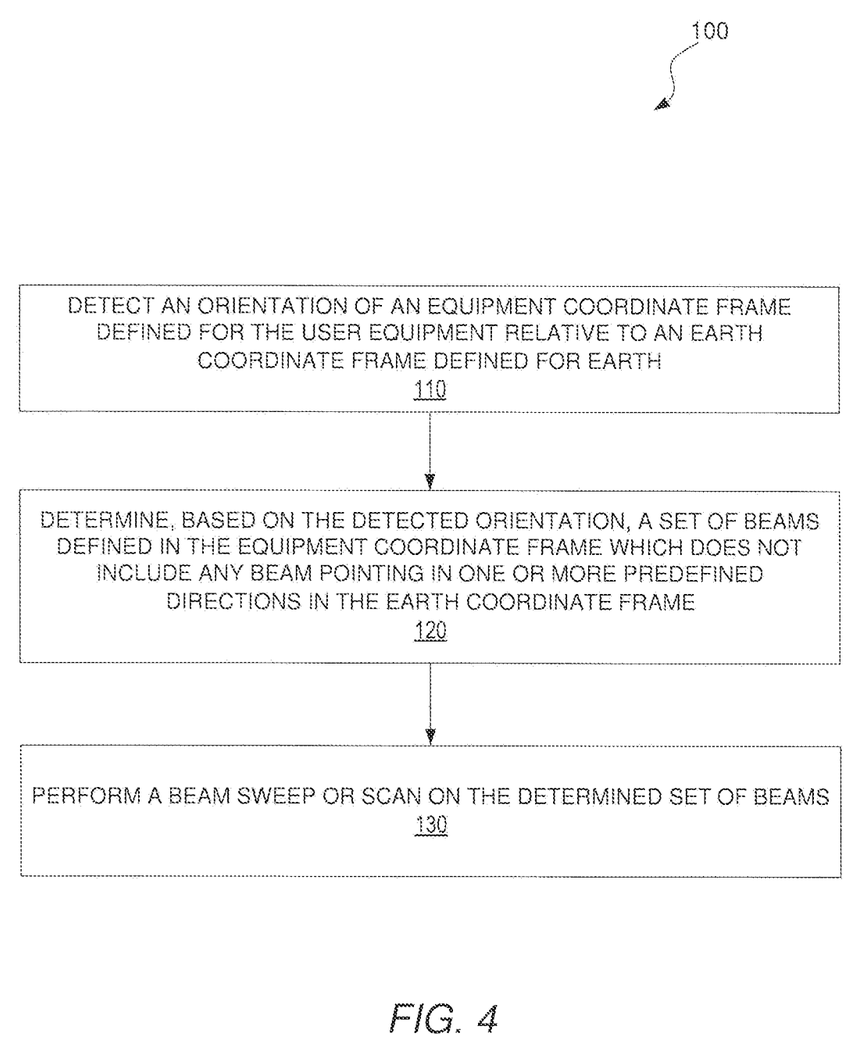
FIG. 4 is a logic flow diagram of a method performed by a user equipment according to some embodiments herein.

In view of the above variations and modifications, FIG. 4 generally illustrates a method 100 performed by a user equipment 10 configured for use in a wireless communication system 12 according to some embodiments. As shown, the method 100 includes detecting an orientation of an equipment coordinate frame 10A defined for the user equipment 10 relative to an earth coordinate frame 16A defined for Earth 16 (Block 110). The method 100 also includes determining, based on the detected orientation, a set 14 of beams defined in the equipment coordinate frame 10A which does not include any beam pointing in one or more predefined directions in the earth coordinate frame 16A (e.g., vertically down and/or up) (Block 120). The method 100 further includes performing a beam sweep or scan on the determined set 14 of beams (Block 130).

The user equipment 10 as described above may perform any of the processing herein by implementing any functional means or units. In one embodiment, for example, the user equipment 10 comprises respective circuits or circuitry configured to perform the steps shown in FIG. 4. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 5A:
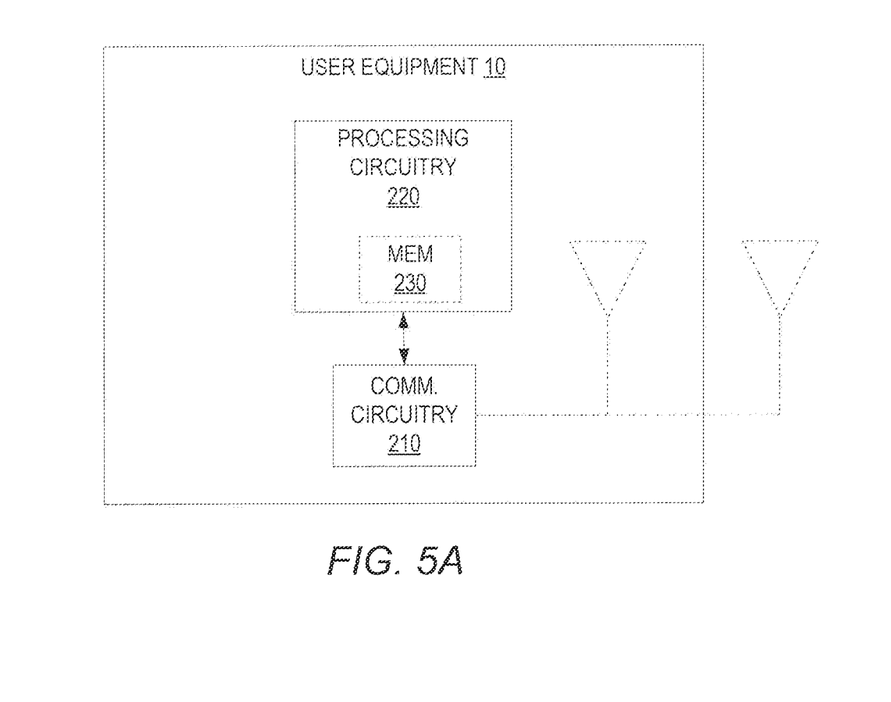
FIG. 5A is a block diagram of a user equipment according to some embodiments herein.

FIG. 5A illustrates a user equipment 10 in accordance with one or more embodiments. As shown, the user equipment 10 includes communication circuitry 210 and processing circuitry 220. The communication circuitry 210 is configured to transmit and/or receive information to and/or from one or more other nodes, e.g., via any communication technology. The communication circuitry 210 may do so for instance via one or more antennas, which may be internal or external to the user equipment 10. In some embodiments, the communication circuitry 210 comprises radio circuitry. The processing circuitry 220 is configured to perform processing described above, e.g., in FIG. 4, such as by executing instructions stored in memory 220. The processing circuitry 220 in this regard may implement certain functional means, units, or modules.

Figure 5B:
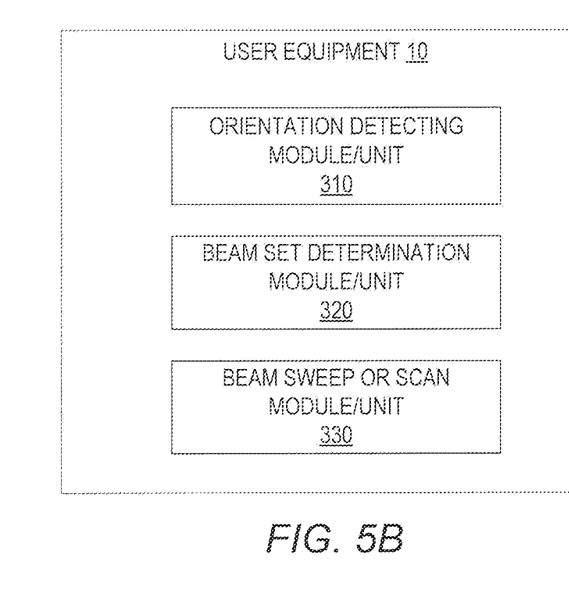
FIG. 5B is a block diagram of a user equipment according to other embodiments herein.

FIG. 5B illustrates a user equipment 10 in accordance with one or more other embodiments. As shown, the user equipment 10 implements various functional means, units, or modules, e.g., via the processing circuitry 220 in FIG. 5A and/or via software code. These functional means, units, or modules, e.g., for implementing the method in FIG. 4, include for instance an orientation detecting module or unit 310 for detecting an orientation of an equipment coordinate frame defined for the user equipment relative to an earth coordinate frame defined for Earth. Also included is a beam set determination module or unit 320 for determining, based on the detected orientation, a set of beams defined in the equipment coordinate frame which does not include any beam pointing in one or more predefined directions in the earth coordinate frame. Further included is a beam sweep or scan module or unit 330 for performing a beam sweep or scan on the determined set of beams.

Those skilled in the art will also appreciate that embodiments herein further include corresponding computer programs.

A computer program comprises instructions which, when executed on at least one processor of a user equipment 10, cause the user equipment 10 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a user equipment 10, cause the user equipment 10 to perform as described above.

Embodiments further include a computer program product comprising program code portions for performing the steps of any of the embodiments herein when the computer program product is executed by a user equipment 10. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a user equipment configured for use in a wireless communication system, the method comprising:
    detecting an orientation of an equipment coordinate frame defined for the user equipment relative to an earth coordinate frame defined for Earth;
    determining, based on the detected orientation and one or more predefined criteria, a set of beams defined in the equipment coordinate frame which does not include any beam pointing in one or more predefined directions in the earth coordinate frame, wherein at least one criterion of the one or more predefined criteria comprises whether the user equipment is located indoors versus outdoors; and
    performing a beam sweep or scan on the determined set of beams.

2. The method of claim 1, wherein the one or more predefined directions include a vertically down direction.

3. The method of claim 1, wherein the one or more predefined directions include a vertically upward direction.

4. The method of claim 1, wherein at least one criterion of the one or more predefined criteria comprises types of access nodes between which the user equipment is or will hand off.

5. The method of claim 1, wherein at least one criterion of the one or more predefined criteria comprises an altitude at which the user equipment is detected, estimated, or assumed to be located.

6. The method of claim 1, wherein determining the set of beams comprises identifying that one or more candidate beams point in the one or more predefined directions and forming the set of beams on which to perform the beam sweep or scan by either subtracting the one or more identified candidate beams from the set or adding beams to the set other than the one or more identified candidate beams.

7. The method of claim 1, wherein performing the beam sweep or scan comprises performing the beam sweep or scan during or before a procedure for initial access to the wireless communication system.

8. The method of claim 1, wherein performing the beam sweep or scan comprises performing the beam sweep or scan during or in preparation of a handover procedure.

9. The method of claim 1, wherein performing the beam sweep or scan comprises performing the beam sweep or scan while the user equipment is in an idle or inactive state or is performing a procedure for transitioning from an idle or inactive state to a connected state.

10. The method of claim 1, further comprising receiving signaling from a network node indicating a number of beams that are or that are to be included in the determined set of beams.

11. The method of claim 1, comprising detecting said orientation based on one or more measurements performed by one or more sensors of the user equipment.

12. The method of claim 11, wherein the one or more sensors of the user equipment comprise one or more of a tilt sensor, a compass, and a gravity sensor.

13. The method of claim 11, comprising detecting said orientation based on detecting which type of application the user equipment executes.

14. The method of claim 1, wherein the determining the set of beams comprises:
    determining that the user equipment has a location that is an indoor location;
    predicting, based on the indoor location, a prediction that an access node is located above or below the user equipment; and
    determining the set of beams based on the prediction.

15. A user equipment configured for use in a wireless communication system, the user equipment comprising:
    processing circuitry and a memory, the memory containing instructions executable by
        the processing circuitry whereby the user equipment is configured to:
        detect an orientation of an equipment coordinate frame defined for the user equipment relative to an earth coordinate frame defined for Earth;
        determine, based on the detected orientation and one or more predefined criteria, a set of beams defined in the equipment coordinate frame which does not include any beam pointing in one or more predefined directions in the earth coordinate frame, wherein at least one criterion of the one or more predefined criteria comprises whether the user equipment is located indoors versus outdoors; and
        perform a beam sweep or scan on the determined set of beams.

16. The user equipment of claim 15, wherein the one or more predefined directions include a vertically down or upward direction.

17. The user equipment of claim 15, wherein the one or more predefined directions include a vertically upward direction.

18. The user equipment of claim 15, wherein at least one criterion of the one or more predefined criteria comprises types of access nodes between which the user equipment is or will hand off.

19. The user equipment of claim 15, wherein at least one criterion of the one or more predefined criteria comprises an altitude at which the user equipment is detected, estimated, or assumed to be located.

20. A non-transitory computer readable medium having stored thereon a computer program that, when executed by processing circuitry of a user equipment configured for use in a wireless communication system, causes the user equipment to:

detect an orientation of an equipment coordinate frame defined for the user equipment relative to an earth coordinate frame defined for Earth;

determine, based on the detected orientation and one or more predefined criteria, a set of beams defined in the equipment coordinate frame which does not include any beam pointing in one or more predefined directions in the earth coordinate frame, wherein at least one criterion of the one or more predefined criteria comprises whether the user equipment is located indoors versus outdoors; and     perform a beam sweep or scan on the determined set of beams.

21. The method of claim 1, wherein the determining the set of beams comprises, when the user equipment is located in an indoor environment, selecting multiple beams for the set of beams that are different from selected beams when the user equipment was located outside the indoor environment.

* * * * *